Figure 1:
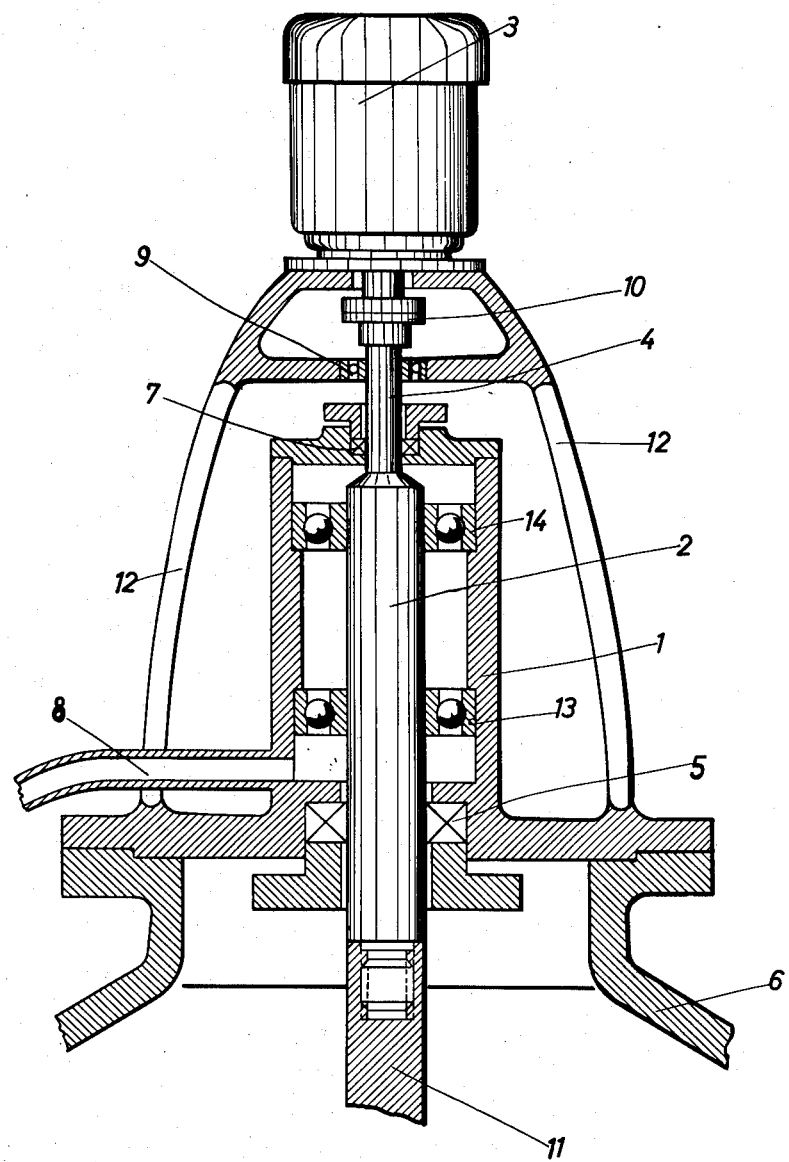

Feb. 5, 1963 E. K. TODTENHAUPT 3,076,684
DRIVING DEVICE FOR AN AGITATOR SHAFT
Filed Jan. 12, 1960 2 Sheets-Sheet 1

Inventor
Erich Karl Todtenhaupt
by
Michael S. Striker
Atty

United States Patent Office 3,076,684
Patented Feb. 5, 1963

3,076,684
DRIVING DEVICE FOR AN AGITATOR SHAFT
Erich Karl Todtenhaupt, Karlstr. 8,
Schopfheim, Baden, Germany
Filed Jan. 12, 1960, Ser. No. 1,958
Claims priority, application Germany Jan. 16, 1959
5 Claims. (Cl. 308—187.1)

This invention relates to a driving device for an agitator shaft which is mounted only at the drive end and which operates in vessels having pressures differing from atmospheric pressure, especially pressures higher than atmospheric, and the invention relates primarily to the construction of the bearing of the overhung agitator shaft.

For the purpose of sealing off agitator shafts in vessels under high pressure it is known per se to use what is known as a barrier pressure seal. It consists in principle of a pressure chamber surrounding the agitator shaft, with packings bearing against the agitator shaft, the said chamber being filled with a barrier medium, the pressure of which can be withdrawn from the vessel either directly or indirectly.

In this known arrangement, the pressure chamber packing facing the vessel is subjected to approximately the same pressure at least, on both sides. This packing requires no substantial contact pressure forces, generates little friction and heat, and has a correspondingly long life. It has only the function of what is known as a separating packing, since its task is confined to preventing a passage of barrier medium into the vessel and conversely of the gases and/or vapours and/or liquids in the vessel into the pressure chamber.

The pressure chamber packing disposed at the drive end of the bearing shaft has to take the full pressure of the barrier medium with respect to the atmosphere. At this sealing point, a small passage of the barrier medium has hitherto been tolerated, and is discharged as leakage.

In consequence of the frequently considerable forces occurring at the agitator tool, the agitator shaft and its bearings must be made so stable that smooth and impact-free running of the agitator shaft is ensured. The large diameter required for the agitator shaft for stability reasons entails considerable difficulties if the pressures prevailing in the vessel differ considerably from atmospheric pressure. A large diameter of the bearing shaft entails considerable evolution of heat, relatively high power requirements and hence automatically relatively considerable wear necessitating frequent change of the packings, owing to the contact pressure forces due to the pressure differences and the resulting frictional forces, and in consequence of the high circumferential speed at the point of the packing due to said large diameter.

The object of the present invention is to eliminate the sealing difficulties arising heretofore out of the large diameter of the bearing shaft, for the bearing housing serving as a pressure chamber, due to high circumferential speed at the sealing point, high heat evolution, considerable friction development, high power requirements and resulting shaft life.

To this end, only the output end of the agitator shaft in the region of the bearing and the seal facing the vessel is dimensioned in accordance with the requirements of smooth and impact-free running, while the diameter of the drive end of the agitator shaft, at least at the seat of the packing taking the high pressure differences between the bearing housing and atmospheric pressure, is reduced to a smaller value sufficient for the transmission of the torque.

Between the bearing housing serving as pressure chamber and the working pressure vessel there is advantageously disposed means for maintaining the pressure fluid in said pressure chamber at a pressure substantially equal to the pressure in said pressure vessel, namely, a pressure compensation vessel which consists of a cylinder with a piston slidable therein, one side of which is subjected to the action of the vapour or gas in the working vessel and the other side of which is subjected to the action of the barrier medium situated in the bearing housing.

The separating packing serving to seal off the working end of the agitator shaft may be a single or multiple gland with small contact pressure, while the packing at the drive end of the agitator shaft advantageously comprises a sliding ring packing.

The barrier medium situated in the bearing housing serving as pressure chamber is advantageously oil or another suitable bearing lubricant.

It has proved advantageous to mount the tapered drive end of the agitator shaft in a cage or the like, which surrounds the bearing housing, by means of an antifriction bearing or the like serving as a step bearing.

Between the driving motor and the drive end of the agitator shaft there is advantageously disposed a coupling which is also known per se. For the purpose of fastening connecting pieces or the like on the drive and/or output end of the agitator shaft and in order to avoid wedges and similar connecting means, use is advantageously made of so-called ring clamp elements, which are also known per se, the parts of the agitator shaft surrounded thereby advantageously having a plain surface.

Figure 2:
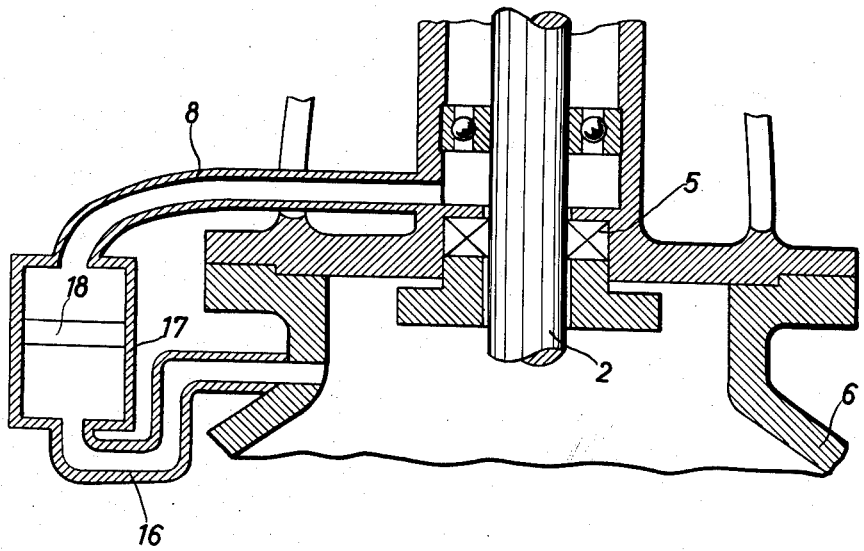

Further details of the invention will be apparent from the following description in conjunction with the drawing in which:

FIG. 1 diagrammatically illustrates in longitudinal section one exemplified embodiment of a driving device according to the invention; and FIG. 2 is a fragmentary view of the device shown in FIG. 1 including diagrammatically a longitudinal sectional view of a pressure compensation vessel as an additional feature in accordance with the invention.

Inside the substantially cylindrical bearing housing 1 surrounded by the cage 12 the large-diameter agitator shaft 2 is mounted by means of two anti-friction bearings 13 and 14, which are disposed with suitable axial spacing. At the upper end of the cage 12, as shown in FIG. 1, there is fastened the drive motor 3, which is coupled through the coupling 10 to the greatly reduced drive end 4 of the agitator shaft 2 which extends through an aperture in the bearing housing 1.

The bearing housing 1, which is flanged on the working vessel 6 so as to be air-tight, is separated from the interior of the working vessel 6 by means of the gland 5, which is constructed as a separating packing. The drive end 4 of the agitator shaft 2 is additionally mounted inside the cage 12 by means of the ball bearing 9 serving as step bearing. The packing 7 provided at the upper end of the bearing housing 1 is advantageously a so-called sliding ring packing. The bearing housing 1, filled with pressure fluid, preferably lubricating oil, communicates through the pressure compensation line 8 with a pressure compensation vessel shown in FIG. 2. The bearing housing 1 forms therefore a pressure chamber and the working vessel 6, the interior of which is held at a pressure differing from atmospheric pressure, forms together with the bearing housing a pressure vessel means in which the large diameter shaft portion 2 of the shaft is located. The pressure compensation vessel provides means for maintaining the pressure fluid in the pressure chamber at a pressure substantially equal to the pressure in the pressure vessel and comprises a cylinder 17 in which a piston 18 is slidably arranged. The conduit 8 is connected to one end of the cylinder and communicates with the interior thereof at one side of the piston 18 while a second conduit 16 communicates with the other end of the cylinder 17 to provide communication between the pressure fluid in the pressure vessel and the interior of the cylinder 17 at the other side of the piston 18. At the bottom end of the agitator shaft 2 the shank 11 of the actual agitator is fastened, for example by means of a so-called ring clamp element, which type of fastening is used preferably for fastening one of the coupling discs to the upper end of the tapered agitator shank 4.

What I claim is:

1. A drive arrangement for driving an agitator in a pressure vessel comprising, in combination, a pressure vessel adapted to contain a fluid under pressure differing from atmospheric pressure; a pressure chamber projecting from said pressure vessel connected thereto; passage means at one end of said pressure chamber and providing communication between said pressure chamber and said pressure vessel; closure means at the other end of said pressure chamber for closing said other end thereof and being formed with an aperture aligned along a common axis with said passage means and having normal to said axis a predetermined cross section smaller than the cross section of said passage means; a drive shaft coaxial with said common axis and having a large diameter portion extending from the interior of said pressure vessel through said passage means into said pressure chamber and a small diameter shaft portion of a diameter substantially smaller than said large diameter shaft portion and of a cross section smaller than said predetermined cross section and extending through said aperture in said closure means to the exterior of said pressure chamber; bearing means in said pressure chamber engaging said large diameter shaft portion for supporting said shaft rotatably about its axis; a pressure fluid in said pressure chamber; means for maintaining the pressure fluid in said pressure chamber at a pressure substantially equal to the pressure in said pressure vessel; first sealing means in said passage means about said large diameter shaft portion for preventing passage of pressure fluid from said pressure chamber into said pressure vessel; second sealing means in said aperture about said small diameter shaft portion for preventing passage of pressure fluid to the exterior of said pressure chamber; and drive means connected to the free end of said small diameter shaft portion for driving said shaft.

2. An arrangement as defined in claim 1 in which said pressure fluid in said pressure chamber is a lubricating liquid.

3. A drive arrangement for driving an agitator in a pressure vessel comprising, in combination a pressure vessel adapted to contain a fluid under pressure differing from atmospheric pressure; a pressure chamber projecting from said pressure vessel connected thereto; passage means at one end of said pressure chamber and providing communication between said pressure chamber and said pressure vessel; closure means at the other end of said pressure chamber for closing said other end thereof and being formed with an aperture aligned along a common axis with said passage means and having normal to said axis a predetermined cross section smaller than the cross section of said passage means; a drive shaft coaxial with said common axis and having a large diameter portion extending from the interior of said pressure vessel through said passage means into said pressure chamber and a small diameter shaft portion of a diameter substantially smaller than said large diameter shaft portion and of a cross section smaller than said predetermined cross section and extending through said aperture in said closure means to the exterior of said pressure chamber; bearing means in said pressure chamber engaging said large diameter shaft portion for supporting said shaft rotatably about its axis; a pressure fluid in said pressure chamber; means for maintaining the pressure fluid in said pressure chamber at a pressure substantially equal to the pressure in said pressure vessel, said means comprising a cylinder, a piston slidable in said cylinder between opposite ends of the latter, first tube means for providing communication between the interior of said pressure vessel at one end of said cylinder, and second tube means for providing communication between the interior of said pressure chamber and the other end of said cylinder; first sealing means in said passage means about said large diameter shaft portion for preventing passage of pressure fluid from said pressure chamber into said pressure vessel; second sealing means in said aperture about said small diameter shaft portion for preventing passage of pressure fluid to the exterior of said pressure chamber; and drive means connected to the free end of said small diameter shaft portion for driving said shaft.

4. A drive arrangement for driving an agitator in a pressure vessel comprising, in combination, a pressure vessel adapted to contain a fluid under pressure differing from atmospheric pressure; a pressure chamber projecting from said pressure vessel connected thereto; passage means at one end of said pressure chamber and providing communication between said pressure chamber and said pressure vessel; closure means at the other end of said pressure chamber for closing said other end thereof and being formed with an aperture aligned along a common axis with said passage means and having normal to said axis a predetermined cross section smaller than the cross section of said passage means; a drive shaft coaxial with said common axis and having a large diameter portion extending from the interior of said pressure vessel through said passage means into said pressure chamber and a small diameter shaft portion of a diameter substantially smaller than said large diameter shaft portion and of a cross section smaller than said predetermined cross section and extending through said pressure chamber; a pair of anti-friction bearings mounted spaced from each other in axial direction in said pressure chamber and engaging said large diameter shaft portion for supporting said shaft rotatably about its axis; a pressure fluid in said pressure chamber; means for maintaining the pressure fluid in said pressure chamber at a pressure substantially equal to the pressure in said pressure vessel; first sealing means in said passage means about said large diameter shaft portion for preventing passage of pressure fluid from said pressure chamber into said pressure vessel; second sealing means in said aperture about said small diameter shaft portion for preventing passage of pressure fluid to the exterior of said pressure chamber; and drive means connected to the free end of said small diameter shaft portion for driving said shaft.

5. A drive arrangement for driving an agitator in a pressure vessel comprising, in combination, a pressure vessel adapted to contain a fluid under pressure differing from atmospheric pressure; a pressure chamber projecting from said pressure vessel connected thereto; passage means at one end of said pressure chamber and providing communication between said pressure chamber and said pressure vessel; closure means at the other end of said pressure chamber for closing said other end thereof and being formed with an aperture aligned along a common axis with said passage means and having normal to said axis a predetermined cross section smaller than the cross section of said passage means; a drive shaft coaxial with said common axis and having a large diameter portion extending from the interior of said pressure vessel through said passage means into said pressure chamber and a small diameter shaft portion of a diameter substantially smaller than said large diameter shaft portion and of a cross section smaller than said predetermined cross section and extending through said aperture in said closure means to the exterior of said pressure chamber; bearing means in said pressure chamber engaging said larger diameter shaft portion for supporting said shaft rotatably about its axis; a pressure fluid in said pressure chamber; means for maintaining the pressure fluid in said pressure chamber at a pressure substantially equal to the pressure in said pressure vessel; first sealing means in said passage means about said large diameter shaft portion for preventing passage of pressure fluid from said pressure chamber into said pressure vessel; second sealing means in said aperture about said small diameter shaft portion for preventing passage of pressure fluid to the exterior of said pressure chamber; a drive motor operatively connected to the free end of small diameter shaft portion for driving said shaft; support means mounted on said pressure vessel and supporting said drive motor; and an additional anti-friction bearing engaging said small diameter shaft portion and mounted on said supporting means.

References Cited in the file of this patent

UNITED STATES PATENTS

| | | |
|---|---|---|
| 759,659 | Braungart | May 10, 1904 |
| 2,398,944 | Kopetz | Apr. 23, 1946 |
| 2,593,939 | Trist | Apr. 22, 1952 |
| 2,627,171 | Brumagim | Feb. 3, 1953 |
| 2,684,273 | Fears et al. | July 20, 1954 |
| 2,684,274 | Saxon | July 20, 1954 |
| 2,688,520 | Covington | Sept. 7, 1954 |
| 2,806,364 | Wilson | Sept. 17, 1957 |